No. 652,954. Patented July 3, 1900.
W. C. DOWNING.
COMBINATION TICKET PUNCH.
(Application filed Dec. 13, 1897.)

(No Model.) 8 Sheets—Sheet 1.

Witnesses:
Inventor:
William C. Downing,
By L. B. Coupland & Co.
Attys.

No. 652,954. Patented July 3, 1900.
W. C. DOWNING.
COMBINATION TICKET PUNCH.
(Application filed Dec. 13, 1897.)
(No Model.) 8 Sheets—Sheet 2.

Witnesses:
Inventor:
William C. Downing,
By L. B. Coupland & Co.
Attys.

No. 652,954.

W. C. DOWNING.
COMBINATION TICKET PUNCH.
(Application filed Dec. 13, 1897.)

(No Model.)

Patented July 3, 1900.

No. 652,954. Patented July 3, 1900.
W. C. DOWNING.
COMBINATION TICKET PUNCH.
(Application filed Dec. 13, 1897.)
(No Model.) 8 Sheets—Sheet 4.

Witnesses:
Inventor:
William C. Downing,
By L. B. Coupland & Co.
Attys

No. 652,954. Patented July 3, 1900.
W. C. DOWNING.
COMBINATION TICKET PUNCH.
(Application filed Dec. 13, 1897.)
(No Model.) 8 Sheets—Sheet 5.

Witnesses:

Inventor:
William C. Downing,
By L. B. Coupland & Co.
Attys.

No. 652,954. Patented July 3, 1900.
W. C. DOWNING.
COMBINATION TICKET PUNCH.
(Application filed Dec. 13, 1897.)
(No Model.) 8 Sheets—Sheet 6.

Witnesses:

Inventor:
William C. Downing,
By L. B. Coupland & Co
Attys.

No. 652,954.

W. C. DOWNING.
COMBINATION TICKET PUNCH.
(Application filed Dec. 13, 1897.)

Patented July 3, 1900.

(No Model.)

No. 652,954. Patented July 3, 1900.
W. C. DOWNING.
COMBINATION TICKET PUNCH.
(Application filed Dec. 13, 1897.)

(No Model.) 8 Sheets—Sheet 8.

UNITED STATES PATENT OFFICE.

WILLIAM C. DOWNING, OF CHICAGO, ILLINOIS.

COMBINATION TICKET-PUNCH.

SPECIFICATION forming part of Letters Patent No. 652,954, dated July 3, 1900.

Application filed December 13, 1897. Serial No. 661,697. (No model.)

*To all whom it may concern:*

Be it known that I, WILLIAM C. DOWNING, a citizen of the United States, residing at Chicago, in the county of Cook and State of Illinois, have invented certain new and useful Improvements in Combination Ticket-Punches; and I do hereby declare the following to be a full, clear, and exact description of the invention, such as will enable others skilled in the art to which it appertains to make and use the same.

This invention relates to improvements in that class of devices shown in Letters Patent No. 588,322, dated August 17, 1897, granted to me.

The object is more especially to provide the ticket-punch in the patent herein referred to with a bell attachment and improve the inking mechanism and other features of construction, as will be hereinafter set forth in detail, the bell attachment and all other parts being actuated by the action or movement of the manipulating lever-handle located in the upper part of the device.

Fig. 25 is a plan of a die member, and Fig. 26 a plan of the lower end of a punch member engaging the die member, Fig. 25. Figs. 27 and 28 are detached details; and Fig. 29 is a vertical transverse section on line 29, Fig. 22, the printing and locking mechanism being removed from the inclosing case.

A is a casing for supporting and inclosing the punching, printing, locking, and bell mechanism. This case or body of the device may be of any desired contour, and access is had from the rear end only and is closed by a removable cap end A'. A receiving-chamber B is located in the opposite closed end. The under side of the case is provided with a rigid handle C and the upper part with a head D, in which is pivotally mounted an actuating lever-handle E, carrying the punchers F and G. The actuating lever-handle is secured in its working position in the head part D by means of a fulcrum pivot-pin $a$. The inner end of this lever-handle is recessed in the punch F, as at $a'$, Figs. 1 and 2. The punch F is adapted to have a vertical movement and is seated in the lower part of the head D and rests below the ticket-slot $a^2$ when in its normal position. The hollow die member $a^3$ is fixed in the upper part of the head D above the ticket-slot and in line with the punch member F. This feature provides for the usual punching of the tickets as they are ordinarily collected, the tickets being inserted in the slot and the actuating lever-handle pressed down to the position shown in Fig. 2, which has the effect of forcing the punch F upward and through an object inserted in the ticket-slot.

In the head part D and back of the fulcrum-pivot of the lever-handle is inserted the vertically-moving punch member G. This punch is provided with a slot-opening $b$ for the passage of the lever-handle therethrough. The hollow die member $b'$ for this punch is fixed in the upper part of the case adjacent to the inner end and opens into the receiving-chamber B. The ticket or object to be punched (indicated by dotted lines in Fig. 1) is inserted in the slot $b^2$, and a downward pressure on the lever-handle imparts a corresponding downward movement to the punch G.

Figure 1:
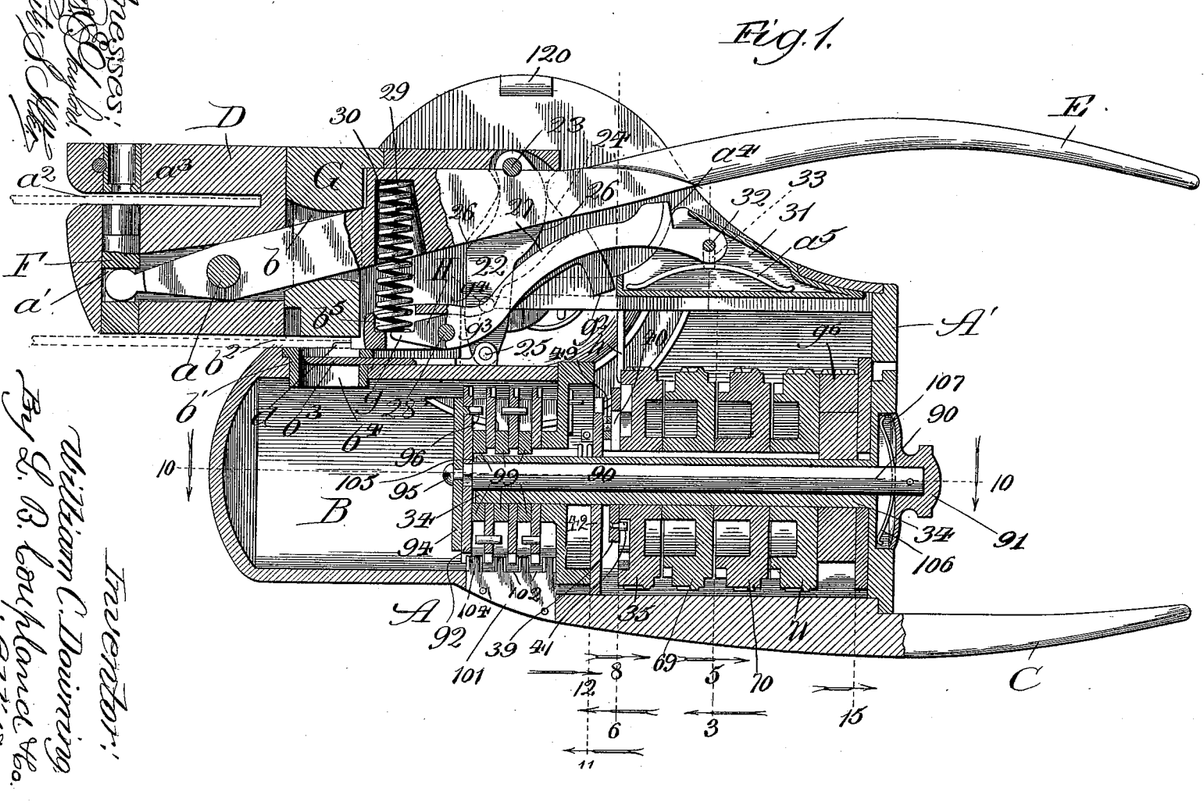
Figure 1 is an enlarged vertical longitudinal section and part elevation of a device embodying the improved features, the working parts being shown in their normal position.
Figure 2:
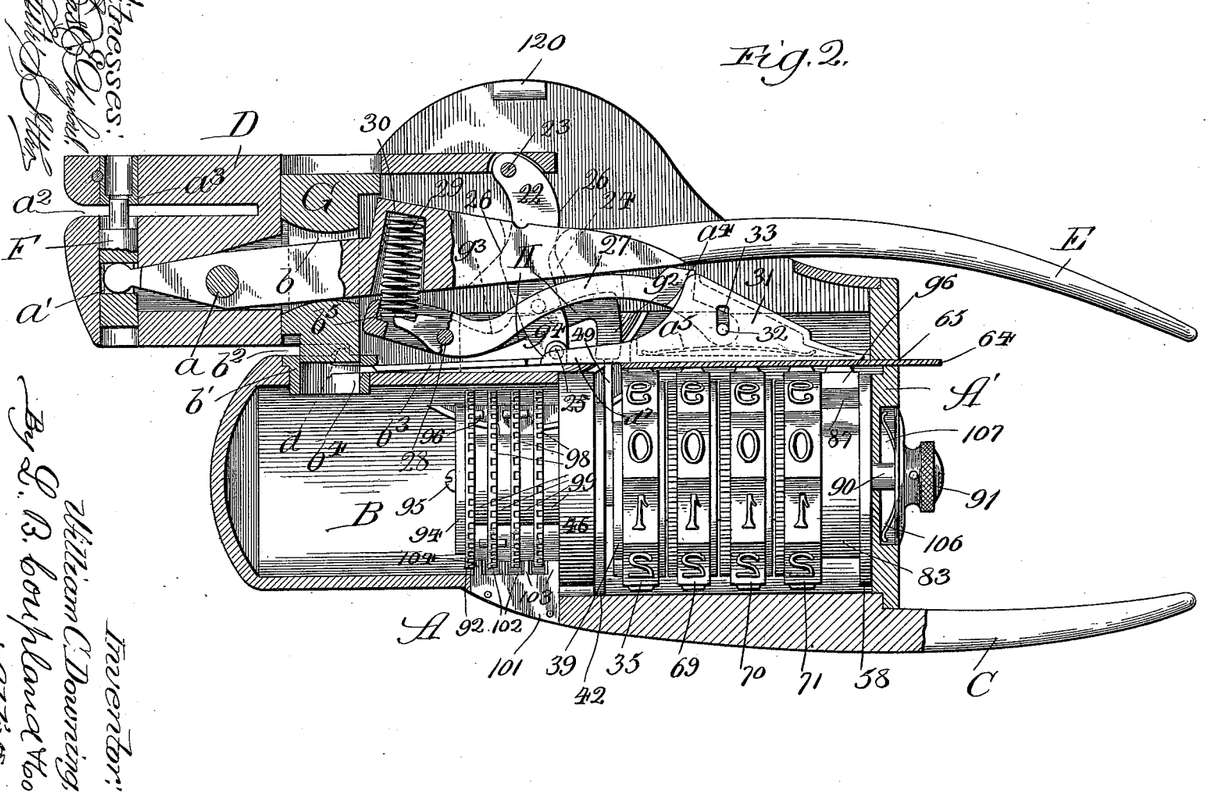
Fig. 2 is a similar view, the manipulating lever-handle and the parts actuated thereby being shown in their opposite position.
Figures 25, 26, 27, 28, 29:
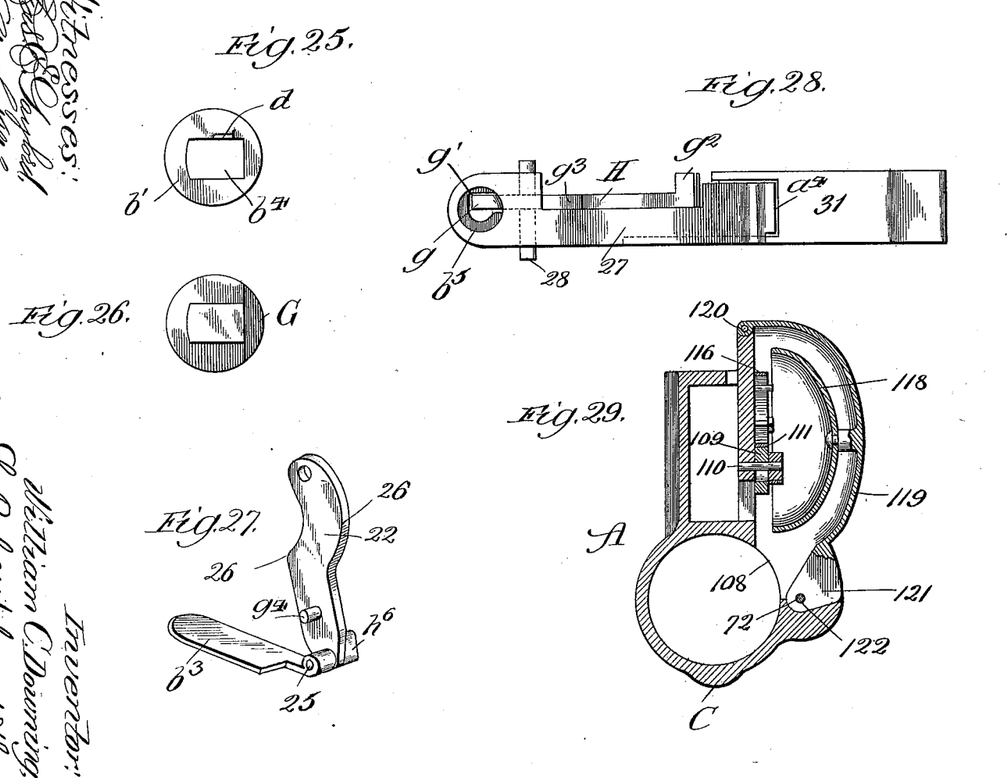

An endwise-slidable plate $b^3$ moves in a horizontal plane and in its normal position projects across and closes the passage $b^4$, Figs. 1, 2, and 25, through the die member $b'$, so that the punched-out matter deposited in the receiving-chamber B by the action of the punch cannot be surreptitiously removed therefrom through the passage in the die when the parts are in their normal position. This sliding plate is automatically operated by means of its connection with a cam-arm and the lever-handle, as will be next described.

The upper end of a cam-shaped arm 22 is secured to the inclosing case by a pivot-pin 23 and passes down through a vertical slot 24 in the lever-handle. The lower end of this arm is pivotally connected to the rear end of plate $b^3$ by a pin 25. It will be noted that the side walls 26 of the slot 24 through the lever-handle are rounded off or irregular, so as to have a cam-like action on the correspondingly-shaped bearing-surface of cam-arm 22 in moving the lower end to its two positions. When the lever-handle is pressed downwardly toward its closing position, the lower end of arm 22 is forced backwardly and the sliding plate $b^3$, pivoted thereto, is retracted to the position shown in Fig. 2 and opens the passage through the die member for the engagement of the punch G and permits the cut-out portion of the ticket to drop into the receiving-chamber. The sliding plate and cam-shaped arm automatically return to their normal position, Fig. 1, when the hand-pressure on the lever-handle is relaxed, the sliding plate closing the passage through the die into the receiving-chamber. The movement of the punch and the sliding plate are so timed as not to interfere with the action of each other.

A curved horizontal lever 27 is secured in its position in the inclosing case by a fulcrum-pin 28, located at a point back of the inner end. The closing movement of the lever-handle brings it in contact with the upper side of the lever 27 and forces the same down to its opposite position from that of normal.

The lower end of a spiral spring 29 is seated in a recess $b^5$, Figs. 1 and 2, formed in the inner end of the lever 27, the upper end being seated in a recess 30 in the under side of the lever-handle. This spring serves the purpose of automatically returning the lever-handle actuating the punches and the other connected parts to their normal position when the hand-pressure is relaxed. The lever 27 curves upwardly from its fulcrum-pin and runs backward, the rear end extending into a chambered impression-plate 31, with which it is connected by a pivot-pin 32. This chambered impression-plate is open at the front and closed at the opposite end and is provided transversely with the elongated slot-opening 33, through which pivot-pin 32 is inserted in connecting the rear end of the lever 27 thereto. The slot-opening 33 provides for a loose connection with lever 27, so that the impression-plate will automatically adjust itself to its change of position and come to a uniform bearing. This slot-opening also provides for a proper adjustment of the plate with reference to tickets of different thicknesses. The impression-plate and lever 27 also have a loose shoulder-contact, as at $a^4$, so that the former has a balancing action in its loosely-suspended working position. A bow-spring $a^5$ is located on the inside of the impression-plate, the respective ends resting on the bottom and the adjacent end of lever 27 resting on the back of said spring. This spring serves the purpose of preventing a too-rigid movement of these parts and injury thereto by a too-sudden closing of the lever-handle. This impression-plate operates in connection with the printing or numbering and dating mechanism, which will be described farther along.

The first punch, located in the extreme front end of the device, is intended for punching the tickets as they are collected and indicates the conductor's private punch-mark thereon, the punched-out parts not being preserved. The second and larger punch is more especially intended for use in collecting cash fares and the retaining of a complete record of the exact amount collected. A ticket or "hat-check" (not shown) designed for use in collecting cash fares will have dollars and fractions thereof and such other data as may be necessary printed thereon and arranged in any convenient manner, so that the required part can be conveniently punched out. The part so punched out of the ticket will show the amount collected and will be deposited in the receiving-chamber. The cash-fare ticket or hat-check may be of the double form or folder, the two parts being exact duplicates, so that the part punched out will be in duplicate. The ticket or check is then torn in two, each part numbered and dated, and one part handed to the passenger, which will be his receipt for the amount paid, and the other part retained by the conductor and turned into headquarters with the punch at the end of the run, when the cash-fare checks and the contents of the receiving-chamber can be compared and the record verified.

The die member $b'$, Fig. 25, is provided on the upper side with guide-lug $d$, projecting upwardly, which serves as a stop or guide in cutting out just so much of the ticket at each punch when the ticket is inserted endwise. This lug feature is more especially adapted for commutation and other tickets having numbers or figures printed thereon in regular order and which require that so much surface be taken out at each punch, the edge made by the part last cut out abutting against the lug at each operation and allowing the ticket to enter just so far. When the character of the ticket is such that it may be punched anywhere, it can be inserted edgewise instead of endwise, the lug not interfering with such operation.

The printing mechanism for numbering and dating the tickets will next be described.

A stationary sleeve or hollow shaft 34 forms an integral part of the removable cap end A' and is inserted longitudinally from the rear end of the case. This sleeve forms an axis for the rotatable numbering and printing disks loosely mounted thereon in their working position. The numerals and other printing characters are arranged on the peripheries of the disks in the manner common to the general class of numbering and recording devices of different types, the general principle of operation being similar.

Figures 6, 8, 9:
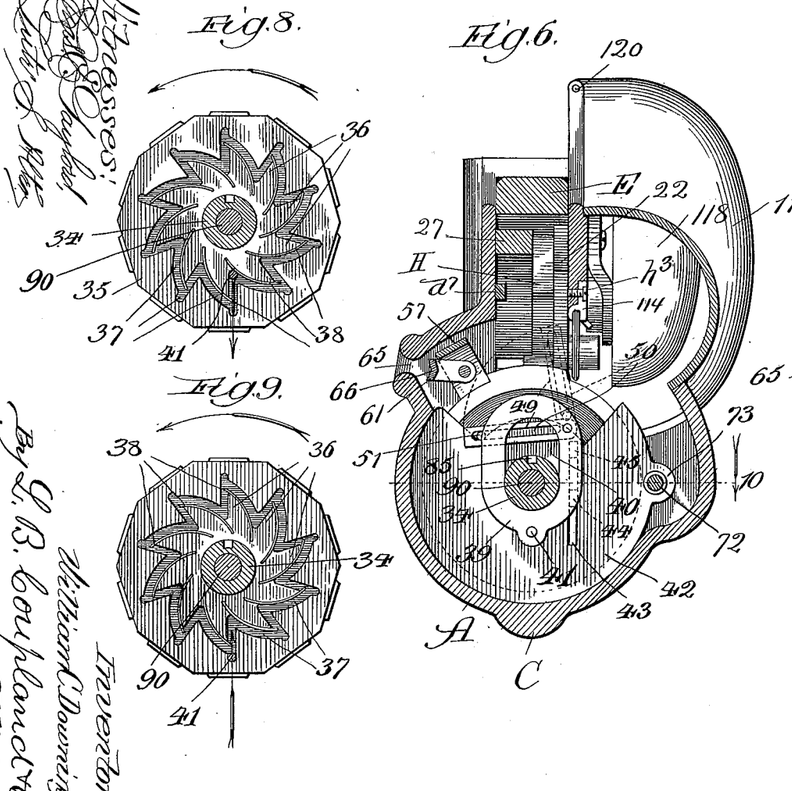
Fig. 6, a transverse section on line 6, Fig. 1, looking in the direction indicated, the working parts shown being in their normal position.
Fig. 8 is a transverse section on line 6 8, Fig. 1, looking in the opposite direction from that of Figs. 6 and 7 and showing an escapement used in operating the numbering or printing disks.
Fig. 9, a similar view showing the shifting pin in its opposite position.
Figures 10, 11, 12, 13:
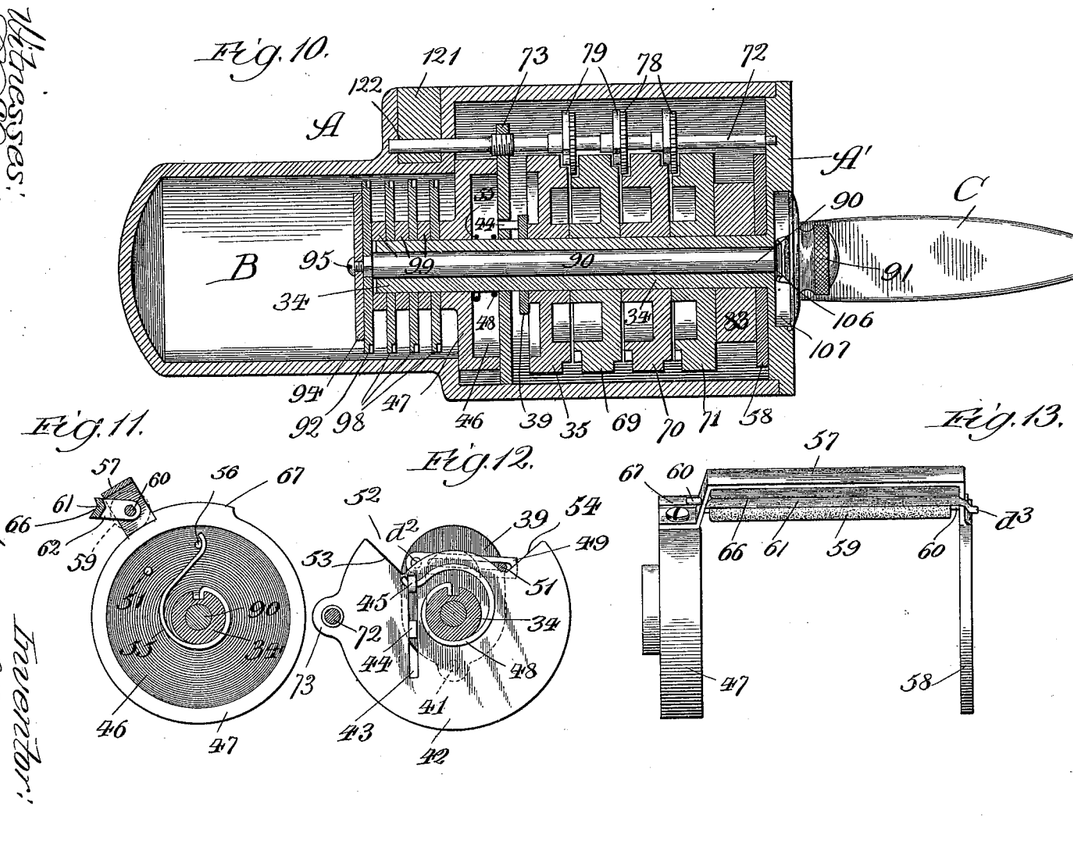
Fig. 10 is a longitudinal horizontal section on line 10, Figs. 1 and 6, looking in the direction indicated.
Fig. 11 is a transverse section on line 11, Fig. 1, looking in the direction indicated.
Fig. 12 is a view taken on the same line, but looking in the opposite direction, showing a circular plate in elevation that is loosely mounted on the axial sleeve.
Fig. 13 is a detached side elevation of the inking attachment.

The units-disk 35 is recessed or cut out on one side, Figs. 8 and 9, to form an integral escapement-wheel, with teeth 36 and the continuous zigzag groove 37, conforming to and following the contour of the teeth of the escapement. To the backs of the series of teeth are secured spring-plates 38, the outer ends of which project into the continuous groove. An elongated yoke 39, Fig. 16, having a corresponding opening 40, is loosely mounted on sleeve 34 and has an up-and-down movement thereon, the two positions of this yoke being shown in Figs. 6 and 7. This yoke lies closely against the escapement side of the units-disk, as shown in Figs. 1, 2, and 10. A pin 41 is inserted in the lower end of the yoke and projects inwardly to engage with the teeth and spring-plates 38 of the escapement-wheel. When the yoke is in its lower position, the pin is in one of the bottom points of the continuous groove, as shown in Fig. 9, the arrows indicating the course of the pin. On the down movement of the yoke the pin 41 comes in contact with and passes by the projecting end of the spring-plate in position. On the up movement of the yoke the pin strikes the back of the spring-plate and the units-wheel is rotated one figure for each upward impact of the shifting pin. A circular plate 42, Figs. 1, 2, 6, 7, 10, and 12, is rigidly mounted on sleeve 34. This plate is provided with an elongated slot 43 in line with one side of the yoke, which has the two lugs 44 and 45 formed thereon. The shorter lug 44 merely extends into the elongated slot and acts as a guide. The longer lug 45 projects through the slot 43 into chamber 46 in a disk-wheel 47, Fig. 11, and is perforated, as at $d'$, Fig. 16, for the insertion of one end of a wire spring 48, as shown in Fig. 12. The disk-wheel 47 is loosely mounted on sleeve 34 and turns thereon. This wire spring coils around the sleeve 34 and has its opposite end secured therein. The circular plate 42, as illustrated in Fig. 12, is shown in a reversed position from that of Figs. 6 and 7, the yoke being indicated by dotted lines on the opposite side. One end of a link 49 is pivoted, as at $d^2$, to yoke 39. This link is provided with a slot 50. A pin 51 is inserted in the adjacent side of disk-wheel 47, Fig. 11, which projects across the cut-out edge 52 of plate 42 and engages with the slotted part of link 49. The shoulders 53 and 54 form stops for the link-pin 51, Figs. 11, 12, and 13, which rides therebetween and limits the movements of these parts.

A spring 55 is located in the chambered side of disk-wheel 47 and encircles sleeve 34. One end of the spring is secured in said sleeve, the opposite extended end bearing against a pin 56, projecting from the adjacent surface of disk-wheel 47, as shown in Figs. 1 and 11.

The inking mechanism is somewhat different from that set forth in Patent No. 588,322.

Figures 3, 4:
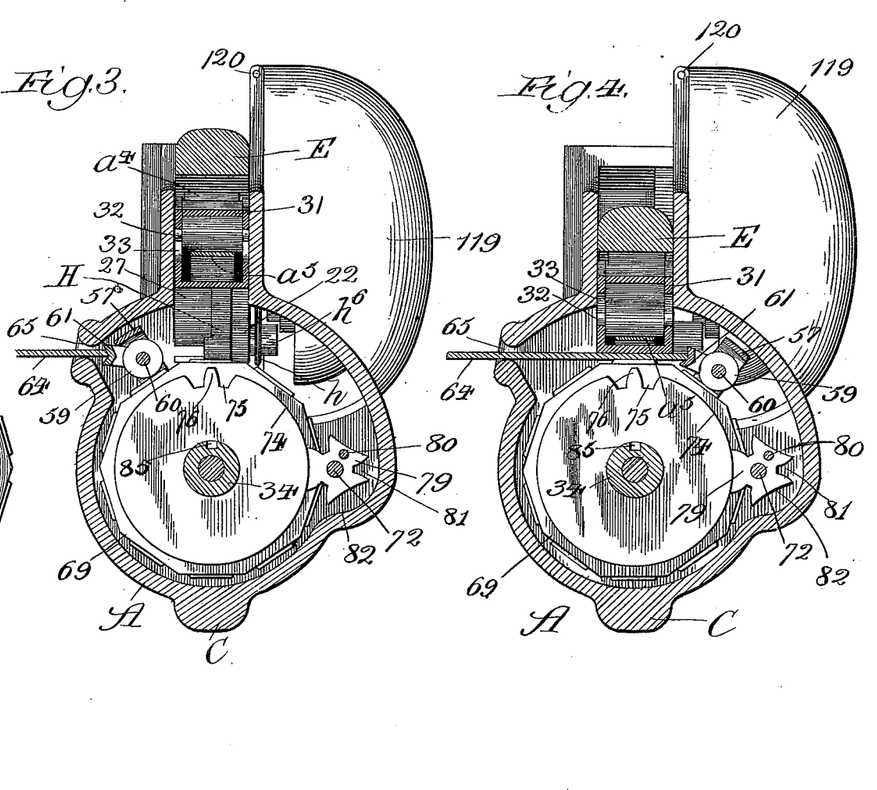
Fig. 3 is a transverse section on line 3, Fig. 1, looking in the direction indicated by the arrow, the parts shown being in their normal position.
Fig. 4 is a view taken on the same line as Fig. 3, the moving working parts being in their opposite position.
Figure 7:
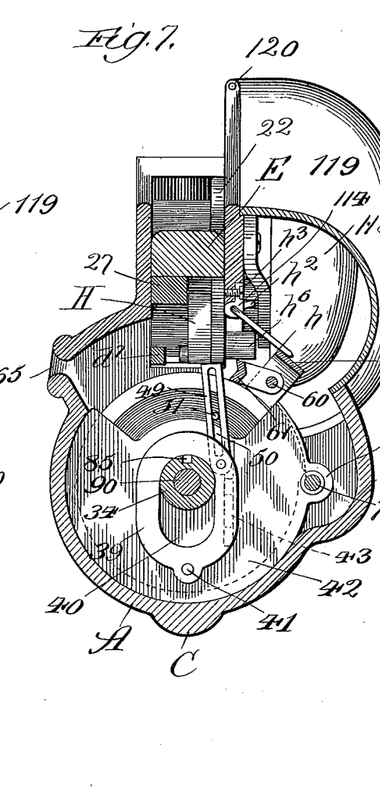
Fig. 7 is a view taken on the same line as Fig. 3, the working parts being in their opposite position.

One end of a bridge or angle-bracket 57, Figs. 6, 7, 11, 13, and 15, is rigidly secured to the periphery of disk-wheel 47, the opposite end being rigidly secured to a companion disk-wheel 58, Fig. 13, also loosely mounted and turning on the outer end of the axial sleeve 34, close to the removable cap end of the case. An inking-roller 59 is mounted on a carrying-shaft 60, having its respective ends journaled in the angle-end parts of the bridge 57. The inking-roller may be made of any suitable absorbent material and dispenses with a ribbon arrangement. A bar 61 is located at one side of the inking-roller and has its respective ends 62 bent at right angles and loosely mounted on the shaft 60, carrying the inking-roller. The normal position of the bar 61 is up against the bridge 57, Figs. 3 and 6, and between that point and the surface of the printing-disks and is adapted to have a limited rocking movement. The opposite or lowermost position of the bar 61 from that of normal is shown in Figs. 4 and 7.

The ticket 64 to be operated upon by the numbering or printing mechanism is inserted through a slot 65 in the side and end of the case and comes in contact with the face of the bar 61, provided longitudinally with a groove 66, which holds the ticket in contact and prevents it from slipping over the top of the same. A slight pressure through the medium of the ticket on the bar 61 forces the same from the normal position shown in Fig. 3 over to the opposite position shown in Fig. 4. The bar 61 is provided with an extended end $d^3$, Fig. 13, which rides upon a shoulder or ledge $d^4$, formed on the inner side of the cap end A', (indicated by the lower dotted line $d^5$ in Fig. 15,) the two upper dotted lines representing and indicating the relative position of the ticket-slot 65. The shoulder $d^4$ ends in the drop-recess $d^6$, Fig. 15. The position of the bar 61 with reference to the printing-surfaces is such that the ticket as it is inserted is slightly inclined upward and does not have contact with the printing-surfaces until its innermost position is reached, Fig. 4, when the extended end $d^3$ of bar 61 drops into the recess $d^6$. In this position the ticket is still held up above the surface of the printing-disks until the impression-plate presses the same down in contact therewith, the bar 61 being moved down to its lowermost position, Figs. 4 and 7, at the same time by the same means.

A lever H is located on the outer side of lever 27, Figs. 1, 2, 6, 7, and 28, and is retained in place by the fulcrum-pin 28, common to both levers. The shorter or toe end $g$ of lever H stops short in the recess $g'$ in the end of the lever 27, so that the lower end of spring 28 may also bear thereon, as shown in Fig. 1, a portion of lever 27 being broken away. The rear end $g^2$ of the lever H is bent downwardly and comes in contact with the upper end of link 49 when it is in its opposite position from that of normal.

The lever H is provided on its upper edge with a low part $g^3$, as shown in Fig. 28 and indicated by dotted lines in Figs. 1 and 2. A projecting pin $g^4$ is fixed in the cam-arm 22, Fig. 27, and rides on the irregular upper side of lever H. In its normal position this pin rests in the low part $g^3$, its opposite position being indicated in Fig. 2. It will be noted that on the return movement the pin $g^4$ travels over a short stretch of slightly-curved surface before reaching the low part, thus keeping the rear turned-down end of the lever H in contact with yoke 39 just long enough to permit of the ticket being raised out of contact with the printing-surface before an impulse is given the units-disk.

The insertion of a ticket imparts a simultaneous movement to the ticket-bar, the bridge, and the inking-roller and carries the same over to the position shown in Fig. 4. At the same time a rotary movement is imparted to the disk-wheel 47, to which one end of the bridge 57 is secured. The movement of the disk-wheel in turn moves the link 49 from its nearly-horizontal normal position (shown in Fig. 6) over to the nearly-vertical position (shown in Fig. 7) by means of the pin 51 of the disk 47 in engagement with the slotted part of the link and traversing the cut-out edge of the circular plate 42. When the lever-handle is being compressed into the working position, (shown in Figs. 2 and 7,) it comes in contact with the lever 27, which in turn forces down the impression-plate 31 onto the ticket just inserted and presses the same down on the printing-disks to receive the required impression therefrom. The closing of the lever-handle also brings the downwardly-bent end $g^2$ of the lever H in contact with the upper end of the link 49 after it has assumed its vertical position and forcing it downward carries along with it the yoke 39 to its opposite position from that of normal, as shown in Fig. 7. The position of the pin 41 in the lower end of the yoke now corresponds with its position in Fig. 9, the arrows indicating the direction and path of the pin. Figs. 6 and 8 show the opposite or normal position of pin 41. When the closing pressure on the lever-handle is relaxed, it is thrown into its open normal position by the spring 29. The downward tension of this spring also returns the lever 27, the impression-plate, and other connecting parts to their normal position. Simultaneously with this movement the spring 48 returns the yoke 39 to its normal position, which movement brings pin 41 in contact with the escapement-teeth in the units-wheel and imparts a single impulse thereto. Simultaneously with the return movement of the yoke the spring 55, chambered in the disk-wheel 47, rotates said disk-wheel back to its normal position and carries with it the bridge, inking-roller, and ticket-bar. The link 49 is also returned to its nearly-horizontal normal position at the same time by means of its pin connection with the disk-wheel 47. At the moment that the pressure on the impression-plate begins to be relaxed and the disk-wheel 47 starts on its return movement the extended end $d^3$ of the ticket-bar 61 rises up out of the drop-recess $d^6$, and the ticket is automatically lifted from contact with the surface of the printing-disks, so that the ticket will not drag and the impression become blurred as it is being withdrawn.

The prolonged inner end $d^7$ of the impression-plate 31 is adapted to come to a stop-bearing on the high part 67, Fig. 11, of the disk-wheel 47. The disk-wheel 58 is also provided with a high part $g^5$, which is normally in the same plane with the corresponding high part of disk-wheel 47. These high parts extend above the line of the surface of the printing-disks and prevent the impression-plate from having contact with and injuring the printing characters when no ticket is inserted and only the punch parts are being used. When the disk-wheel 47 is rotated by the insertion of a ticket, the high side thereon is moved out of the way of the impression-plate, so that contact may be had with the ticket at the proper time. When the disk-wheel 58 is in its normal position, the high part thereof covers and closes that part of the ticket-slot 65 that is in the end cap A'. The ticket-bar 61 at the same time covers that part of the ticket through the side of the case, thus preventing fraudulent access when only the punch parts are being used. It will be understood that the action of the different parts is so timed that each begins its movement at the proper time to bring about the desired result. The units-wheel 35 is the first in the series and is moved one figure between each two successive impacts. Next the tens-disk 69 is actuated when the units-disk has passed beyond its highest number, next the hundreds-disk 70, and then the one-thousand disk 71, in regular order of succession and using as many numbering-disks in the series as the character of the work may require.

The means employed for transmitting motion to the printing-disks in the regular order of arrangement will next be described.

Figure 5:
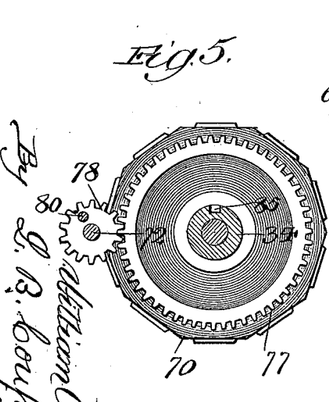
Fig. 5 is a transverse section on line 5 3, Fig. 1, looking in the opposite direction from that of Figs. 3 and 4, as indicated.

A stationary shaft 72, Figs. 5, 6, 7, 10, 12, 22, and 29, has its rear end fixed in the cap end A'. This shaft passes through a lug 73, formed on the circular plate 42, and supports the same in its stationary position and ends in a part of the inclosing case, first passing through a lug formed on a cap covering the bell attachment, as shown in Fig. 10. Each of the printing or numbering disks except the last one of the series is cut away close around on the forward side, so as to provide an annular shoulder 74 of a less diameter than that of the disk proper, as shown in Figs. 3 and 4. This shoulder is recessed on one side, as at 75, and is provided in this recess with a tooth 76, which projects a little beyond the line of the shoulder. The adjacent surface of the next numbering-disk is provided with the integral toothed gear-wheel 77, which is also of a less diameter than that of the disk proper, as illustrated in Fig. 5. On shaft 72, Figs. 5 and 10, are mounted pinions 78, which are in engagement with the gear-wheel part of the different numbering-disks. Locking-tumblers 79 are also mounted on shaft 72 and are secured to the respective pinions by a pin 80. The locking-tumblers have three equal sides, with a recess 81 between each two adjacent sides, as shown in Figs. 3 and 4. The bearing-sides are curved out, as at 82, to conform to the periphery of the annular shoulder 74, with which one of the sides is always in contact.

The operation is as follows: When the units-disk has made one revolution, the tooth 76 comes in contact with the adjacent side of the locking-tumbler, bearing on the annular shoulder 74, and imparts a rotary movement to the tumbler and brings the next side into a locking position when the tooth shall have passed out of contact. The tumbler imparts a corresponding motion to the adjacent pinion, which in turn moves the tens-disk one figure at the proper time, and so on throughout the series. A dating-disk 83, Figs. 1, 2, 10, and 17, is mounted on the outer end of sleeve 34 in a stationary position, the inner edge being provided with a tongue 84, Fig. 17, engaging with a groove 85, running lengthwise of the sleeve and locking the dating-disk against a rotary movement. This disk is provided with a recessed projection 86, with which the extension 87 on the dating-block engages. A screw 88, inserted through a lug 89, bears against the dating-block on the opposite side and holds the same in its working position. This provides for the convenient insertion and removal of different dating-blocks $g^6$, as may be required from time to time.

The lock attachment will next be described.

Figures 14, 15, 16, 17, 18, 19, 20, 21:
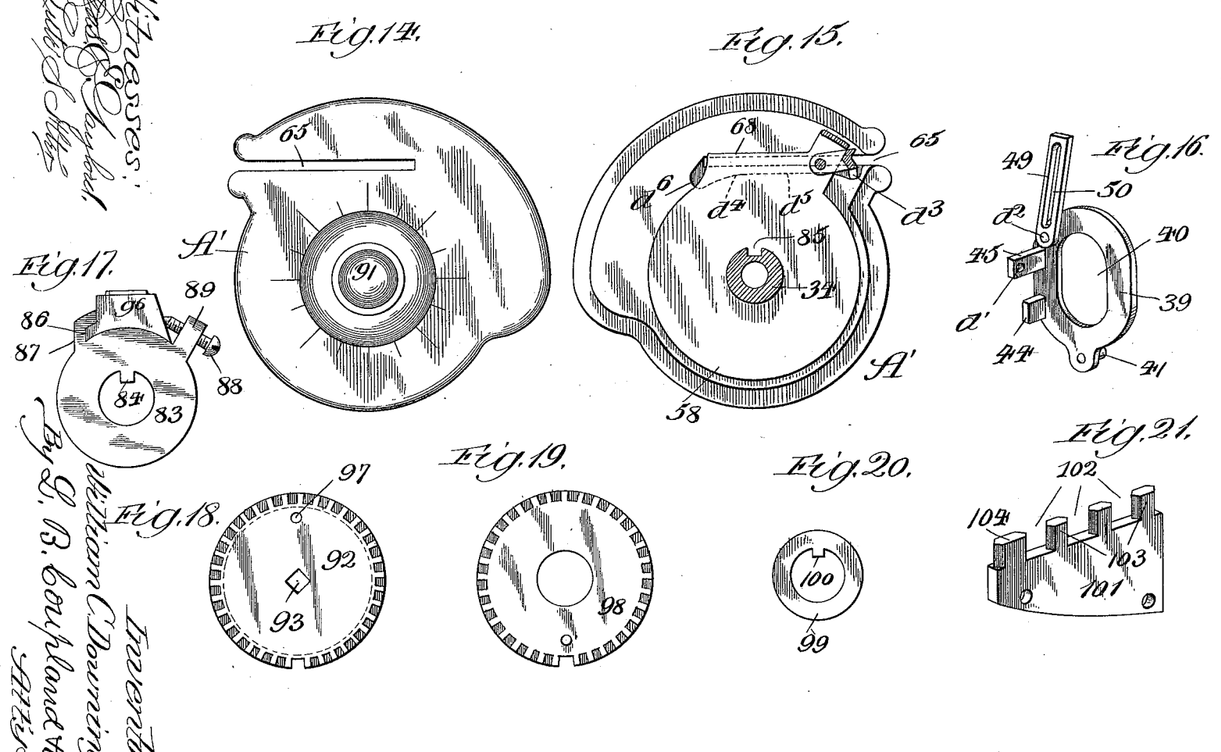
Fig. 14, an end elevation, the handles being omitted.
Fig. 15 is a transverse section on line 15, Fig. 1.
Fig. 16 is a detached detail in perspective.
Fig. 17, a detached elevation of a part of the dating-disk.
Fig. 18 is an elevation of a stationary locking-tumbler.
Fig. 19 is an elevation of one of the rotatable disks.
Fig. 20 is an elevation of one of the stationary washers placed between the locking-tumblers.
Fig. 21 is a detached perspective of a toothed plate forming a part of the locking mechanism.

A spindle 90 is inserted longitudinally through the sleeve 34 and has a knob 91 mounted on the outer end thereof. The first tumbler 92, Fig. 18, has a square aperture 93 therethrough and is mounted on the correspondingly-square inner end of the spindle 90, Figs. 1 and 10. A disk-plate 94 is rigidly secured to the inner end of the spindle by a screw 95. This plate is provided with a pin 96, which projects through an aperture 97 in tumbler 92 and secures the two together in a working position. The rest of the series of tumblers 98, Figs. 2 and 19, are loosely mounted on sleeve 34 and are retained in their proper relative position by division-washers 99, Fig. 20, mounted on the sleeve 34 between each two adjacent tumblers and locked against a rotary movement by a lip 100, engaging with the longitudinal groove in the sleeve. A toothed plate 101, Fig. 21, is secured in a proper relative position with reference to the tumblers, so that the end cap and printing mechanism can only be removed when the notches 102 in the edges of the tumblers are all brought into line with the teeth 103 of the plate 101. The wider tooth 104 prevents the turning of the first tumbler, which normally is in contact therewith, until the spindle has been forced inwardly by a pressure on knob 91, when the tumbler 92 will clear the wider tooth 104 and may be rotated. Neither can the spindle be drawn outward far enough for the first tumbler to clear the wider tooth, as the other tumblers will come in contact with their respective teeth. A space 105, Fig. 1, is provided for between the inner end of the axial sleeve and the adjacent surface of the first tumbler. Thus the first tumbler bears against its division-washer instead of against the end of the sleeve and exerts a pressure against the washers and tumblers by reason of the outward pressure of the spring 106, seated in a recess 107 in the cap end, bearing against the knob end of the spindle. Thus the spindle is returned to its normal position by the action of the spring when the pressure on the knob is relaxed and the tumblers prevented from turning when the printing and locking mechanism is removed from the case. The cap end is provided with the usual indicating-dial face, as shown in Fig. 14.

The bell attachment will next be described.

Figures 22, 23, 24:
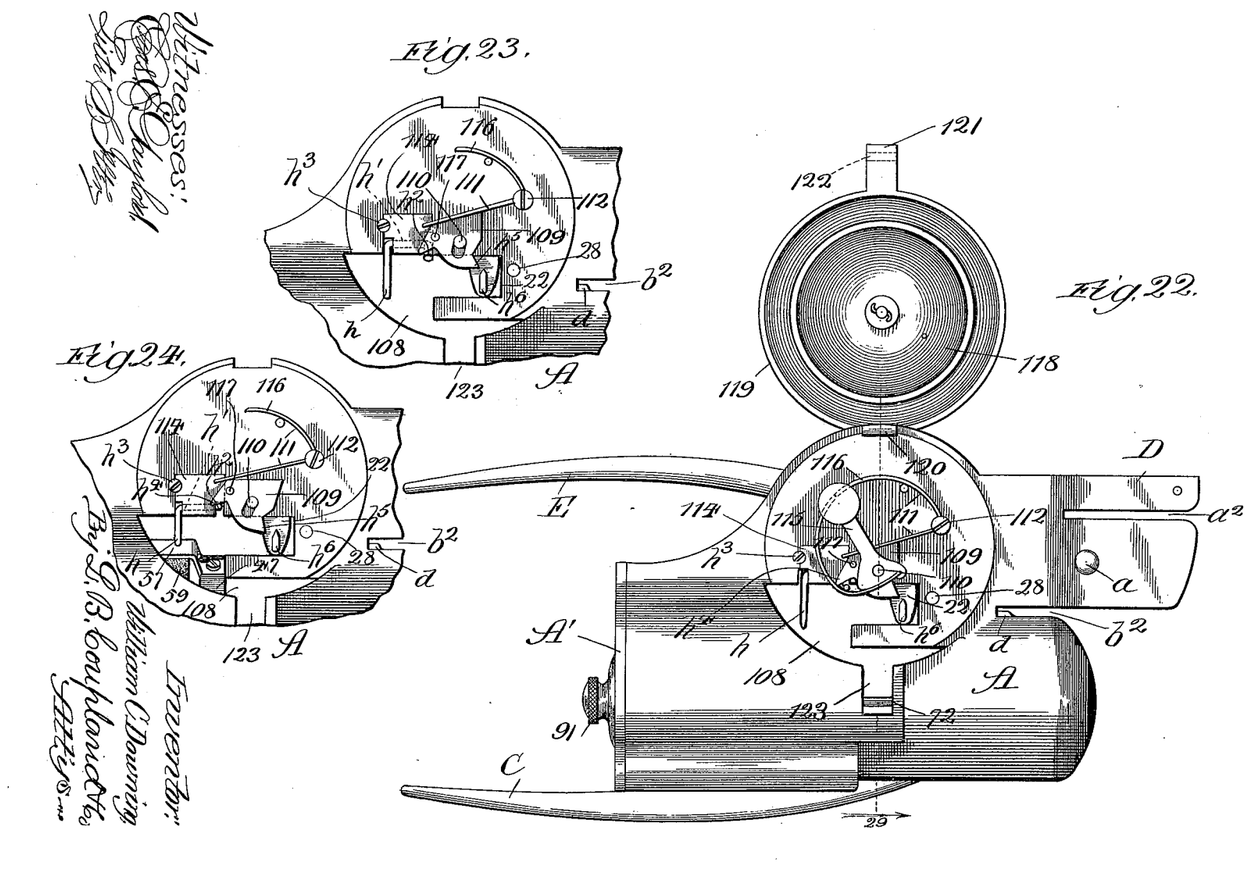
Fig. 22 is a side elevation of the device proper, the cap covering the bell-chamber being thrown open.
Figs. 23 and 24 are broken-away elevations showing parts of the bell mechanism, the covering-cap being removed.

The bell attachment is mounted on one side of the device, as illustrated in Figs. 3, 4, 6, 7, and 29, the details and operation of the working parts being more fully shown in Figs. 22, 23, and 24. The opening 108 in the case provides for contact with the elements necessary to actuate the bell parts. A cam-plate 109 is loosely mounted on a fixed pin 110 and is retained in its normal position, Figs. 22 and 23, by a spring 111, pressing on the upper side thereof. This spring is retained in place by a screw 112. An angle-bar 113, consisting of the vertical end part $h$, the horizontal part $h'$, and the terminal end $h^2$, is bent into a downward diagonal direction with reference to the vertical part $h$, as shown in Figs. 6, 22, and 23, the opposite position of this angular bar being shown in Figs. 7 and 24. The horizontal part $h'$ is inserted through and has a rocking bearing in a plate 114, secured in place by a screw $h^3$. The cam-plate 109 is provided with a turning-tooth $h^4$ and a tripping-tooth $h^5$. The bell-hammer is carried on one end of an arm 115, the opposite end of which is loosely mounted on pin 110. One end of a striking-spring 116 is secured in place by the screw 112, the opposite end being secured in the pivoted end of the arm carrying the bell-hammer. A post 117 projects from the face of the cam-plate 109 and is adapted at the proper time to come in contact with and move the bell-hammer arm to its opposite or striking position. The lower end of the cam-shaped arm 22 is provided on the bell side with a projection $h^6$, Figs. 22, 23, 24, and 27. Now when the actuating lever-handle is compressed the bridge 57 of the inking mechanism comes in contact with the drop end $h$ of the angular bar and pushes the same up to position shown in Figs. 7 and 24. This movement raises the diagonal end $h^2$ up in contact with the under side of the turning-tooth $h^4$ and turns the cam-plate 109 far enough to bring the tripping-tooth $h^5$ around in the path of the projection $h^6$, formed on the lever end of the cam-arm 22, which coming in contact with the tripping-tooth rotates the cam-plate 109 and brings the post 117 against the bell-arm and moves the same to its striking position, when the projection on the cam-arm passes out of contact and the required alarm is sounded. The cam-plate 109 is provided with an elongated axial slot $i$, which will permit the plate to rise up and clear the projection on arm 22 when returning to its normal position should the ticket still be in place. The gong or bell 118 is mounted on the inside of the inclosing cap 119, having the hinge connection 120, and is shown thrown open up to the open position in Fig. 22. This cap is provided with a lug 121, having an aperture 122 therethrough and adapted to fit into a recess 123 in the case, Figs. 22 and 29. This cap is locked in its closed position by the extended end of shaft 72, so that no access can be had to the bell mechanism for fraudulent purposes, as the printing and locking mechanism must first be withdrawn from the case before the bellcap can be opened. This arrangement combines and embodies in one structure all the different features necessary to retain a complete record of a run and prevent fraudulent practices, as access cannot be had to the inclosed parts except by those having knowledge of the lock combination.

At the end of the trip the punch is turned in with the collected tickets and cash fares and the record compared.

Having thus described my invention, what I claim as new, and desire to secure by Letters Patent, is—

1. The combination with the lever-handle, of the curved horizontal lever, with which the former is adapted to have a moving contact, of an impression-plate, having a loose pivotal connection with said horizontal lever, and a spring, inserted between the impression-plate and its actuating-lever.

2. The combination with a chambered impression-plate, of a curved horizontal lever, having one end inserted therein and pivotally connected thereto, a spring inserted between the inner bottom side of said plate and connecting-lever, and the actuating lever-handle.

3. The combination with the impression-plate, having an elongated slot opening transversely therethrough, of a lever, pivotally connected thereto by a pin inserted through said slot, and the printing-disks, whereby said plate will automatically adjust itself in its working position and provide for the insertion of an object of a different thickness between the plate and the printing-disks.

4. The combination with a bridge or bracket, of companion disk-wheels, to which the respective ends of said bridge are rigidly secured, an inking-roller, having the ends of its carrying-shaft journaled in the angle ends of said bridge, and a ticket-bar, having its ends turned at right angles, loosely mounted on the respective ends of the inking-roller shaft, and means for returning said parts to their normal position.

5. The combination with the ticket-bar, provided with an extended end, of the closing cap end, provided on the inner side thereof with a shoulder or ledge ending in a drop recess, said extended end being adapted to ride on said shoulder.

6. The combination with its supporting-shaft, of a ticket-bar, loosely connected thereto and provided, longitudinally, with a ticket-bearing groove and normally held in its uppermost position.

7. The combination with a cam-arm, of a projecting pin, fixed therein, a fulcrumed lever H, having the rear end bent downwardly and provided on the upper side with an irregular surface over which said pin rides, the slotted link 49, with which the rear end of said lever is adapted to engage when in its opposite position from that of normal, and means for automatically returning said lever to its normal position when the working pressure is relaxed.

8. The combination with a fulcrumed lever H, having the rear end bent downwardly, of a spring, bearing on the opposite end thereof, a cam-arm, a projecting pin, fixed therein, a slotted link, a disk-wheel, carrying a pin engaging said link, a circular plate, having a cut-out edge on which the link-pin rides, a yoke, provided with lugs engaging a slot in said circular plate and having a pin fixed in the lower end, the escapement mechanism, and the printing mechanism.

9. The combination with the case, having a ticket-slot opening through one side and end, of a disk-wheel, having a high part and adapted to close that portion of the slot opening in the end of the case, and the ticket-bar, adapted to close that part of the slot running along the side, when only the punch parts are being used.

10. The combination with the disk-wheels 47 and 58, each being provided with a high part which is in the same plane when said wheels are in their normal position, of the impression-plate, adapted to come to a stop on said high parts when no ticket is inserted.

11. The combination with the case and the locking mechanism, of a spring, recessed in the outer side of the case and bearing against the knob end of the spindle and adapted to prevent the lock-tumblers from accidentally turning.

12. The combination with a cam-plate, loosely mounted on a fixed pin and provided with a turning-tooth, of an angle-bar, having a rocking movement, of the bridge 57, adapted to come in contact with the vertical end of said bar and push the same upwardly when a ticket is inserted; the opposite end of said bar being brought into engagement with the turning-tooth on and rotating said cam-plate in one direction, and the spring for returning said cam-plate to its normal position.

13. The combination with a cam-plate, loosely mounted and provided with a turning-tooth and a tripping-tooth, of an angle-bar having one end in position to engage the turning-tooth, the cam-arm 22, provided on the lower end with a projection, the bridge 57, adapted to have a push contact with the opposite end of said angle-bar and rotate the cam-plate far enough to bring the tripping-tooth into position to be engaged by the projection on said cam-arm, the bell-hammer arm, the pin, fixed in the cam-plate and engaging said arm, and the striking-spring.

14. The combination with the bell-cap, provided with a lug having an aperture therethrough, of the stationary shaft 72, having one end inserted through said lug and locking said cap in its closed position.

In testimony whereof I affix my signature in presence of two witnesses.

WILLIAM C. DOWNING.

Witnesses:
L. M. FREEMAN,
L. B. COUPLAND.